(12) United States Patent
Davidson

(10) Patent No.: US 8,621,546 B2
(45) Date of Patent: Dec. 31, 2013

(54) DISPLAY-ENABLED REMOTE DEVICE TO FACILITATE TEMPORARY PROGRAM CHANGES

(75) Inventor: Ryan S. Davidson, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 39 days.

(21) Appl. No.: 13/332,557

(22) Filed: Dec. 21, 2011

(65) Prior Publication Data

US 2013/0162906 A1 Jun. 27, 2013

(51) Int. Cl.
*H04N 7/173* (2011.01)
(52) U.S. Cl.
USPC .............................. 725/133; 725/141; 725/153

(58) Field of Classification Search
USPC ........................... 725/133, 141, 153; 348/734
See application file for complete search history.

(56) References Cited

U.S. PATENT DOCUMENTS 4,918,531 A * 4/1990 Johnson ........................ 348/565
6,567,984 B1 * 5/2003 Allport ........................ 725/110

* cited by examiner

*Primary Examiner* — Hunter B Lonsberry
(74) *Attorney, Agent, or Firm* — Volpe and Koenig, P.C.

(57) ABSTRACT

A method for displaying two different content items on a main display device and a remote device includes displaying content in a first display mode, generating a content switch event to switch from the first display mode to a second display mode, and displaying content in the second display mode. In the first display mode, a first content item is displayed on the main display device. In the second display mode, a second content item is displayed on the main display device, and the first content item is displayed on the remote device.

27 Claims, 7 Drawing Sheets

DISPLAY-ENABLED REMOTE DEVICE TO FACILITATE TEMPORARY PROGRAM CHANGES

FIELD OF THE INVENTION

The present invention is generally directed to displaying video content, and in particular, to a method and apparatus for temporarily displaying a primary video program on a remote device while temporarily displaying a secondary video program on a main display device.

BACKGROUND

When watching live television, users often are tempted to flip between two channels due to a desire to avoid watching commercials or out of boredom. In such instances, the user typically switches from a primary program to a secondary program when a commercial or uninteresting passage appears in the playback of the primary program. The user then typically toggles back and forth between the secondary program and the primary program until the user has discerned that the commercial break or uninteresting passage has ended for the primary program, at which point the user resumes the uninterrupted playback of the primary program.

This toggling approach has at least two drawbacks. One, the user often does not timely realize that the commercial break or uninteresting passage in the primary program has already ended and thus misses a portion of the primary program immediately following the end of the commercial break or uninteresting passage. Two, the user's attention to the secondary program is interrupted by the frequent flipping back to the primary program to check the status of the primary program, thereby preventing the user from even temporarily enjoying the secondary program. These problems are exacerbated by the relatively long "tuning" time needed to switch the television tuner from one digital channel to another digital channel.

A known solution is the use of picture-in-picture (PIP) to watch both the primary program and the secondary program simultaneously. However, this approach is problematic, because displaying two programs simultaneously can be distracting and the secondary picture may obscure some important display content of the primary picture.

SUMMARY OF EMBODIMENTS

In a system including a main display device and a portable remote device, a method is performed in response to a content switch event at the portable remote device, switching a display of a first content item from the main display device to the portable remote device and switching a display of a second content item from the portable remote device to the main display device.

A method for displaying two different content items on a main display device and a remote device includes displaying content in a first display mode, generating a content switch event to switch from the first display mode to a second display mode, and displaying content in the second display mode. In the first display mode, a first content item is displayed on the main display device. In the second display mode, a second content item is displayed on the main display device, and the first content item is displayed on the remote device.

A method for displaying two different content items, employing a main display device and a remote device, includes a first mode and a second mode. In the first mode, a first content item is displayed on the main display device. In the second mode, the first content item is displayed on the remote device and a second content item is displayed on the main display device responsive to a switch event.

A system for displaying two different content items on a main display device and a remote device includes a main display device and a remote device. The main display device is configured to display a first content item in a first display mode. The remote device includes a display and a content switch configured to generate a content switch event. The content switch event switches the system from the first display mode to a second display mode, in which the main display device displays a second content item and the remote device displays the first content item.

A portable remote device includes a content switch configured to generate a content switch event that initiates a switch of a display of a first content item from the portable remote device to a main display device and a display of a second content item from the main display device to the portable remote device.

A computer-readable storage medium storing a set of instructions for execution by a portable remote device, the set of instructions includes instructions that, when executed, manipulate the portable remote device to generate a content switch event that initiates a switch of a display of a first content item from the portable remote device to a main display device and a display of a second content item from the main display device to the portable remote device.

BRIEF DESCRIPTION OF THE DRAWINGS

A more detailed understanding may be had from the following description, given by way of example in conjunction with the accompanying drawings wherein.

DETAILED DESCRIPTION

It is noted that while some of the examples described herein refer to a television program, the concepts are equally applicable to other multimedia programs, such as, for example, video over the Internet. In addition, a "channel" may be a data stream associated with a program or other video content, for example, a television program or a multimedia segment. For purposes of the discussion herein, the terms "program" and "content" may be used interchangeably.

In one embodiment, a user may temporarily view a secondary program while waiting for the end of a commercial break in the primary program in a manner that allows the user to avoid channel toggling or overshooting the end of the commercial break. In this embodiment, the entirety of a main display device may be used for displaying a single program. To this end, a remote device with a display screen is used. The remote device may include, but is not limited to, a traditional remote control device used to control the operation of the main display device, a video-enabled cellular phone (e.g., a "smart phone"), a tablet computing device, or any other portable wireless device capable of displaying video. In one embodiment, the remote device may be battery powered.

When the user anticipates a commercial break in a primary program displayed on a television or other primary display device (also referred to herein as the "main display device"), the user manipulates a control on the remote device to cause the main display device to tune to a secondary program. Contemporaneously, the remote device begins to display the content of the primary program. Alternatively, the remote device may display the secondary program and then switch to display the primary program. With the secondary program on the main display device and the primary program on the remote device, the user then may view the secondary program while periodically checking the display of the remote device to ascertain the progress of the commercial break or uninteresting passage in the primary program. When the user determines from the remote device that the commercial break or uninteresting passage is ending, the user then manipulates a button or other control on the remote device to cause the primary program and the secondary program to switch devices. That is, to cause the main display device to again display the primary program while the display of the remote device switches to the secondary program, or alternatively, ceases display altogether.

Under this approach, the entire "real estate" of the main display device may be devoted to only a single program at any given time, thereby allowing the user to view the entire content of the program. At the same time, quick checks of the remote device display allow instantaneous assessment of the progression of a commercial break and thus reduces the likelihood that the user will overshoot the end of the commercial break while viewing the secondary program.

Figure 1:
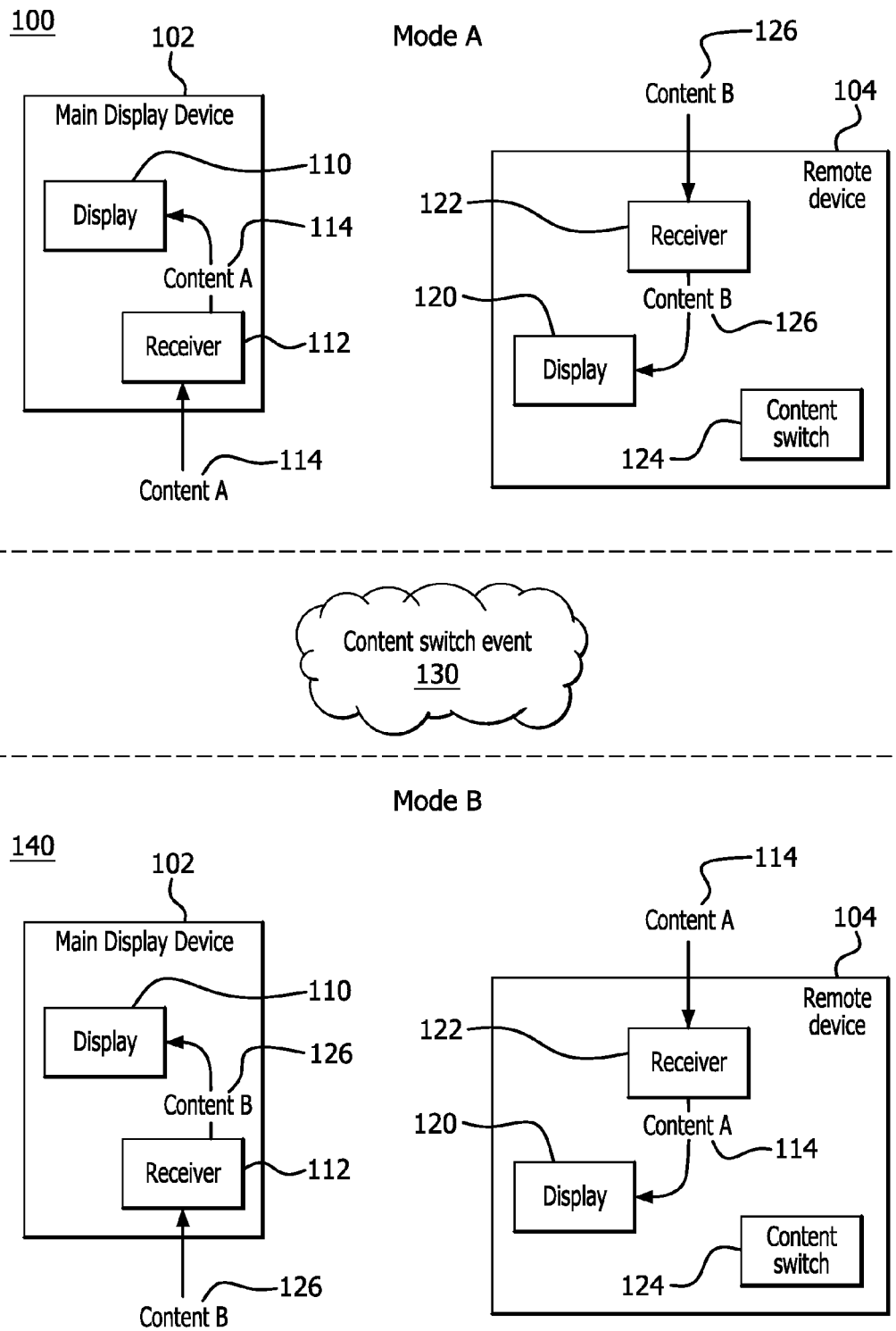
FIG. 1 is a block diagram showing different operation modes for a main display device and a remote device.

FIG. 1 is a block diagram showing different operation modes for a main display device and a remote device. In a first mode 100 (Mode A), there is a main display device 102 and a remote device 104. The main display device 102 includes a display 110 and a receiver 112. Content A 114 is provided to the receiver 112, which in turn provides content A 114 to be displayed on the display 110.

The remote device 104 includes a display 120, a receiver 122, and a content switch 124. Content B 126 is provided to the receiver 122, which in turn provides content B to be displayed on the display 120. Content switch 124 is used to generate a content switch event 130, which changes from operation Mode A 100 to a second operation mode 140 (Mode B). These two operation modes will be referred to below in describing particular embodiments.

In operation Mode B 140, the main display device 102 and the remote device 104 are constructed as in Mode A 100. The difference between the two operation modes is in the content that is supplied to the respective devices. In operation Mode B 140, content B 126 is provided to the receiver 112 of the main display device 102. The receiver 112 provides content B 126 to be displayed on the display 110. In the remote device 104, content A 114 is provided to the receiver 122, which in turn provides the content A 114 to be displayed on the display 120.

Figure 2:
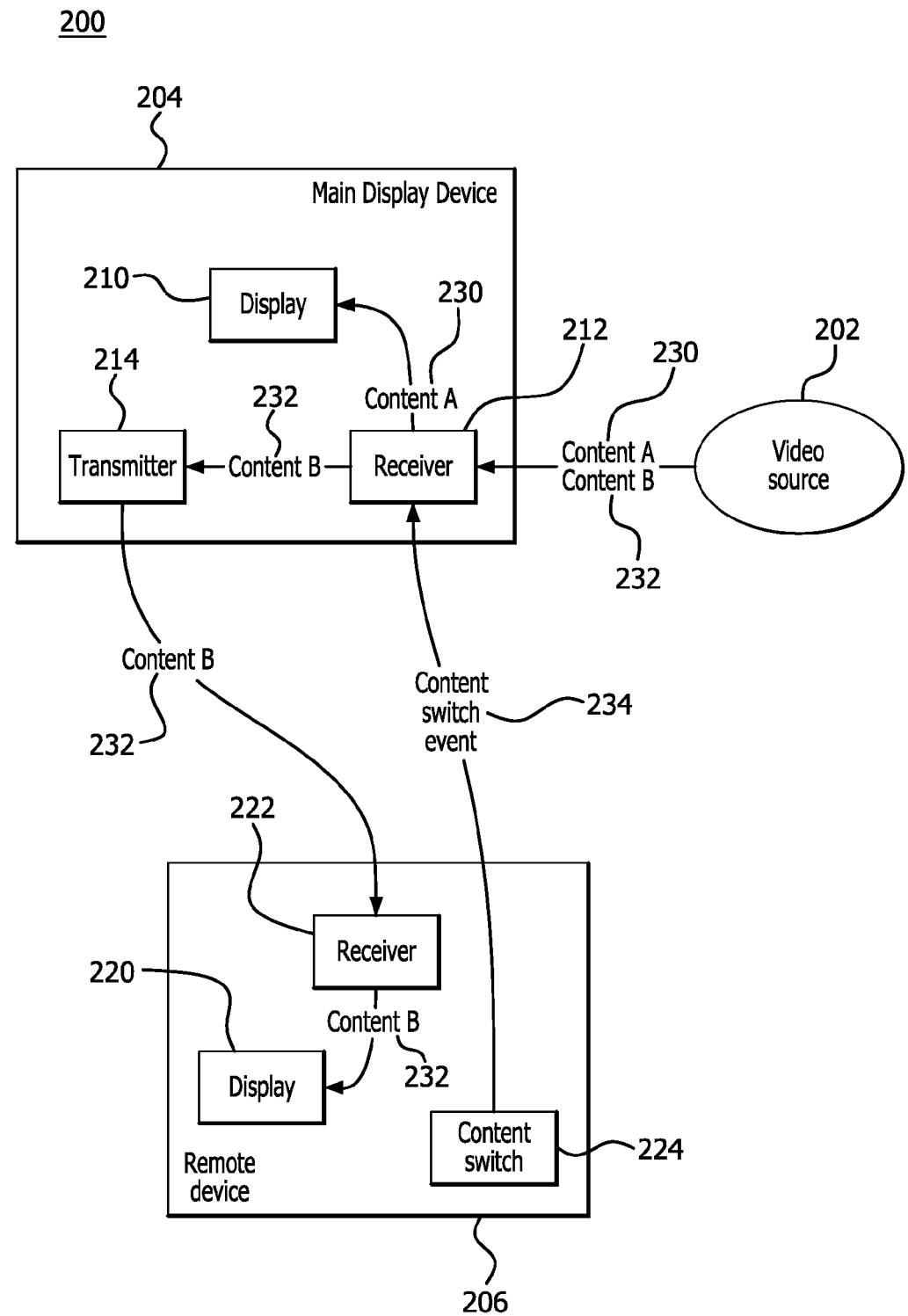
FIG. 2 is a block diagram showing one configuration for providing video content to the main display device and the remote device.

FIG. 2 is a block diagram showing one configuration 200 for providing video content to a main display device and a remote device. The configuration 200 uses a video source 202, a main display device 204, and a remote device 206. The main display device 204 includes a display 210, a receiver 212, and a transmitter 214. The remote device 206 includes a display 220, a receiver 222, and a content switch 224.

In operation, the video source 202 provides content A 230 and content B 232 to the main display device 204. In the main display device 204, the receiver 212 provides the content A 230 to the display 210 and the content B 232 to the transmitter 214, which sends the content B 232 to the remote device 206. In the remote device 206, the receiver 222 forwards the content B 232 to the display 220. This is operation Mode A, as described in connection with FIG. 1.

When the content switch 224 in the remote device 206 generates a content switch event 234, the content switch event 234 is sent to the receiver 212 in the main display device 204. The configuration 200 is then switched from operation Mode A to operation Mode B. In operation Mode B (not shown in FIG. 2), the receiver 212 in the main display device 204 provides the content B to the display 210. The receiver 212 provides the content A 230 to the transmitter 214, which sends the content A 230 to the remote device 206. In the remote device 206, the receiver 222 forwards the content A 230 to the display 220.

In one embodiment, the main display device 204 is a PIP-enabled television or other type of television that makes use of two or more tuners/decoders, one of which may be used to support the remote device 206, where in operation Mode A, the content B 232 is streamed in encoded or unencoded form to the remote device 206 via either an embedded wireless link or via an add-on wireless transmitter connected to a video output of the main display device 204. Alternatively, the main display device 204 may include an embedded wireless transmitter or an add-on transmitter to transmit encoded video data to the remote device 232, which then decodes the video data for display.

Figure 3:
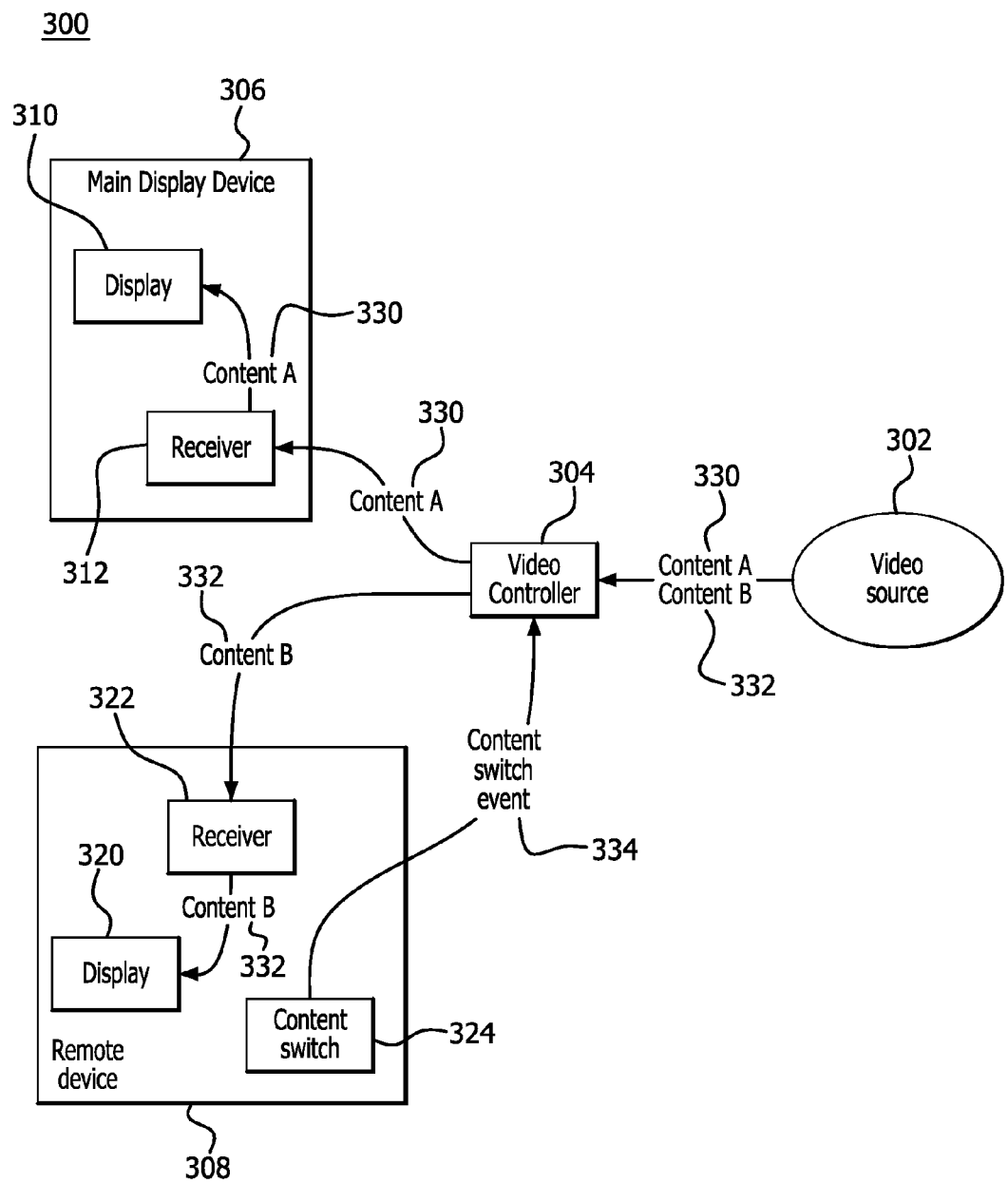
FIG. 3 is a block diagram showing a second configuration for providing video content to the main display device and the remote device.

FIG. 3 is a block diagram showing a second configuration 300 for providing video content to a main display device and a remote device. The configuration 300 uses a video source 302, a video controller 304, a main display device 306, and a remote device 308. The main display device 306 includes a display 310 and a receiver 312. The remote device 308 includes a display 320, a receiver 322, and a content switch 324.

In operation, the video source 302 provides content A 330 and content B 332 to the video controller 304. The video controller 304 sends the content A 330 to the main display device 306 and sends the content B 332 to the remote device 308. In the main display device 306, the receiver 312 forwards the content A 330 to the display 310. In the remote device 308, the receiver 322 forwards the content B 332 to the display 320. This is operation Mode A, as described in connection with FIG. 1.

When the content switch 324 in the remote device 308 generates a content switch event 334, the content switch event 334 is sent to the video controller 304. The configuration 300 is then switched from operation Mode A to operation Mode B. In operation Mode B (not shown in FIG. 3), the video controller 304 sends the content B 332 to the main display device 306. The receiver 312 in the main display device 306 forwards the content B 332 to the display 310. The video controller 304 sends the content A 330 to the remote device 306. In the remote device 306, the receiver 322 forwards the content A 330 to the display 320.

Alternatively, the video controller 304 may be, for example, a digital video recorder (DVR), an Apple® TV box, a Slingbox®, or other video controller device, which supplies the content A 330 to the main display device 306 and streams the content B 332 to the remote device 308 via an Internet Protocol-based mechanism. Alternatively, the video source 302 may be provided via Ethernet, IEEE 802.11, Bluetooth, etc., and the video controller 304 acts as a multiplexer that controls which device is displaying the content A 330 and which device is displaying the content B 332 at any given time.

Figure 4:
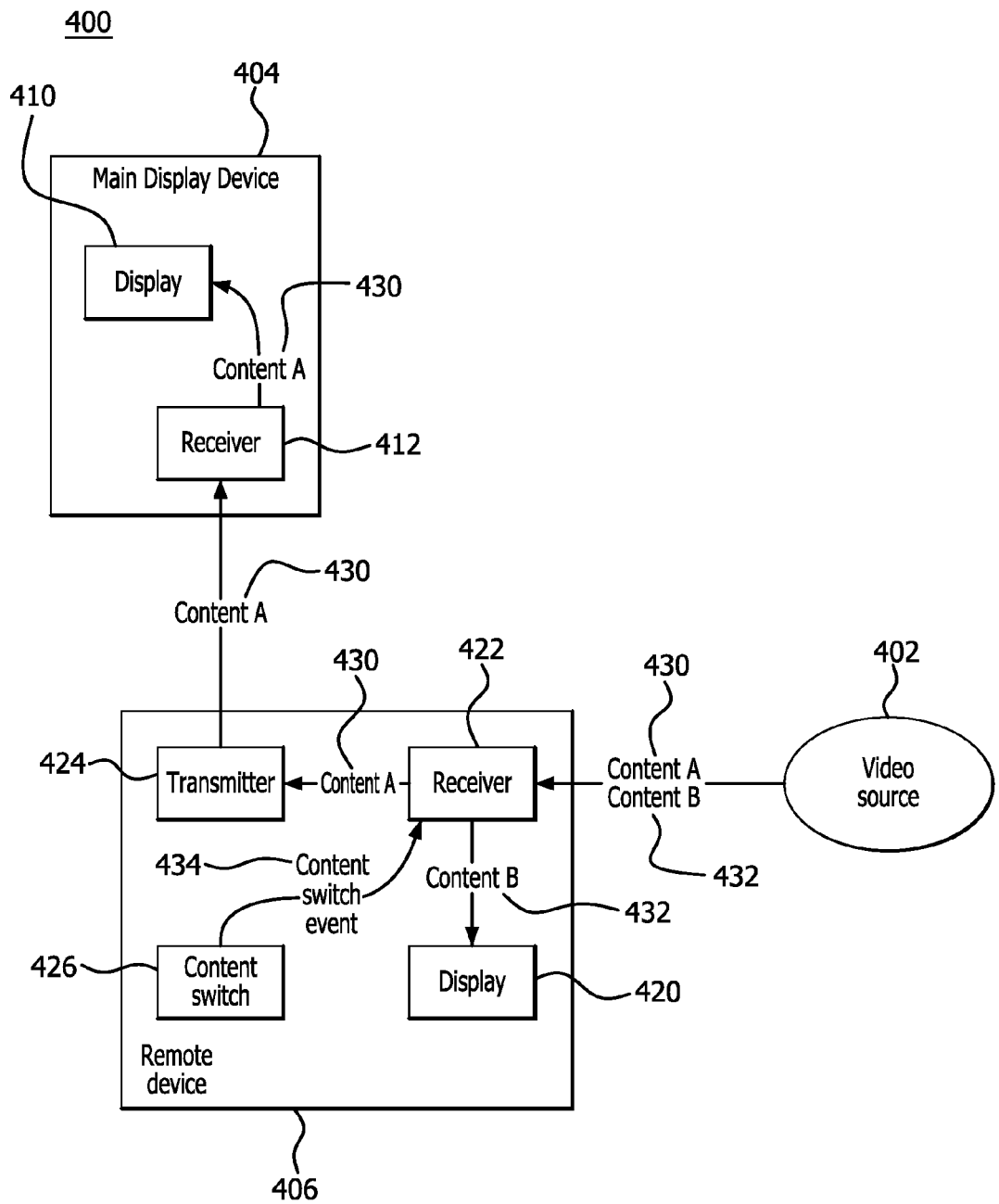
FIG. 4 is a block diagram showing a third configuration for providing video content to the main display device and the remote device.

FIG. 4 is a block diagram showing a third configuration 400 for providing video content to a main display device and a remote device. The configuration 400 uses a video source 402, a main display device 404, and a remote device 406. The main display device 404 includes a display 410 and a receiver 412. The remote device 406 includes a display 420, a receiver 422, a transmitter 424, and a content switch 426.

In operation, the video source 402 provides content A 430 and content B 432 to the remote device 406. In the remote device 406, the receiver 422 forwards the content A 430 to the transmitter 424, which sends the content A to the main display device 404. In the main display device 404, the receiver 412 forwards the content A 430 to the display 410. The receiver 422 forwards the content B 432 to the display 420. This is operation Mode A, as described in connection with FIG. 1.

When the content switch 426 in the remote device 406 generates a content switch event 434, the content switch event 434 is sent to the receiver 422. The configuration 400 is then switched from operation Mode A to operation Mode B. In operation Mode B (not shown in FIG. 4), the receiver 422 in the remote device 406 provides the content A 430 to the display 420. The receiver 422 provides the content B 432 to the transmitter 424, which sends the content B 432 to the main display device 404. In the main display device 404, the receiver 412 forwards the content B 432 to the display 410.

Figure 5:
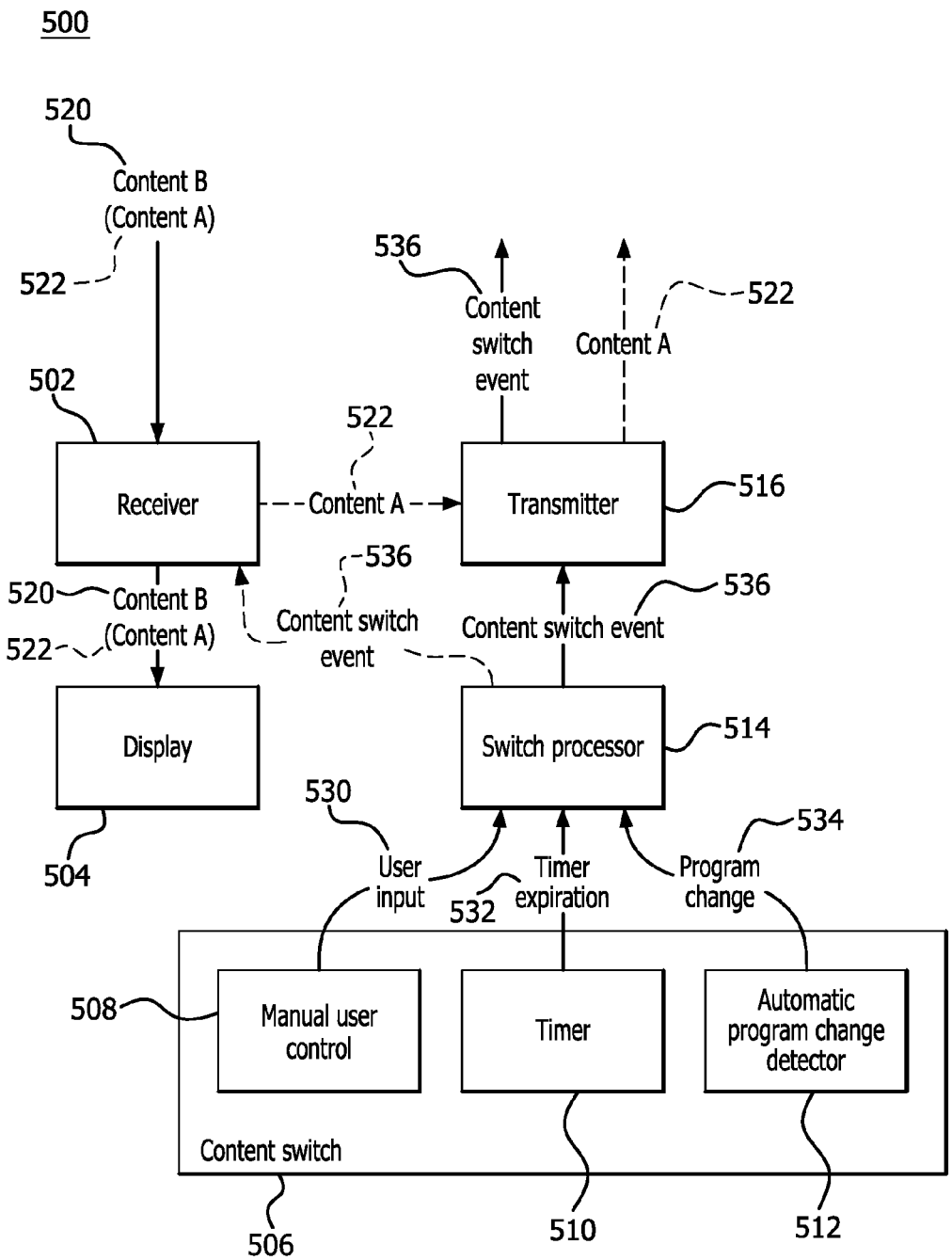
FIG. 5 is a block diagram showing detail of the remote device.

FIG. 5 is a block diagram showing detail of a remote device 500 that may be used in connection with any of the configurations described above. The remote device 500 includes a receiver 502 in communication with a display 504. The remote device 500 also includes a content switch 506. The content switch 506 includes a manual user control 508, a timer 510, and an automatic program change detector 512. The manual user control 508 may include a soft button on a touch screen display of the remote device, a hard button on the remote device, input of a voice command via a microphone of the remote device, or other forms of manual user input. It is noted that the content switch 506 includes at least one of the manual user control 508, the timer 510, or the automatic program change indicator 512, and may include any combination of the three. The manual user control 508, the timer 510, and the automatic program change indicator 512 provide input to a switch processor 514, which is in communication with a transmitter 516.

In operation Mode A, the receiver 502 receives content B 520, which may be a secondary video program, and displays the content B 520 on the display 504. It is noted that the remote device 500 may alternatively not receive or display any content while in operation Mode A. In operation Mode B, the remote device 500 displays content A 522 on the display 504.

There are several ways to switch between operation Mode A and operation Mode B. A user may operate the manual user control 508 on the remote device 500 to provide a user input 530 to the switch processor 514. Alternatively, the user may set a timer 510, and when the timer expires, it sends a timer expiration signal 532 to the switch processor 514. As another alternative, the automatic program change detector 512 may detect indicia of a scene change or a content-type change in the content, including, but not limited to, a volume change, a vertical blanking interval, a rapid change in motion or brightness in the content, etc. In response to one of these content change events, the automatic program change detector 512 sends a program change signal 534 to the switch processor 514. The automatic program change detector 512 may alternatively be configured to detect when a program displayed by a main display device (not shown in FIG. 5) changes.

Upon receiving the user input 530, the timer expiration signal 532, or the program change signal 534, the switch processor 514 generates a content switch event 536 and forwards the content switch event 536 to the transmitter 516, which transmits the content switch event 536 to the main display device (configuration 200, shown in FIG. 2), a video controller (configuration 300, shown in FIG. 3), or to the receiver 502 (configuration 400, shown in FIG. 4). When the content switch event 536 is received by the appropriate destination, the system is switched between operation Mode A and operation Mode B, as described in connection with FIG. 1.

In one implementation, the different switch command sources (the manual user control 508, the timer 510, and the automatic program change detector 512) may be used in combination to switch from operation Mode A to operation Mode B and back to operation Mode A. For example, the user may operate the manual user control 508 to switch from operation Mode A to operation Mode B. Upon entering operation Mode B, the timer 510 may be automatically set to a predetermined time or the automatic program change detector 512 may be automatically activated. Then when the timer 510 expires or the automatic program change detector 512 detects a program change, the system is switched back to operation Mode A without further user intervention.

Figure 6:
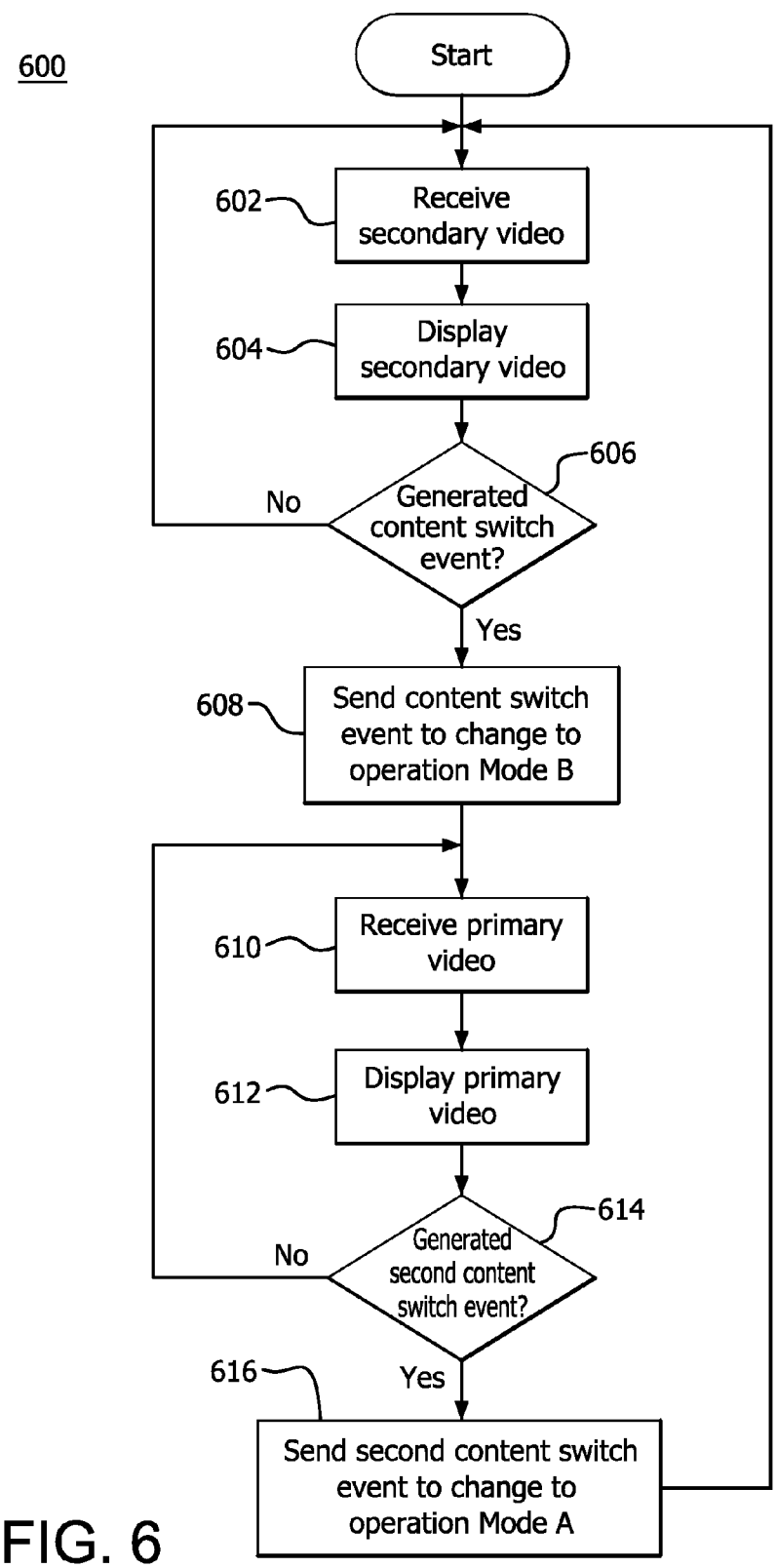
FIG. 6 is a flowchart of a method for displaying secondary and primary video programs on a remote device.

FIG. 6 is a flowchart of a method 600 for receiving and displaying secondary and primary video programs on a remote device. The remote device receives a secondary video program (step 602) and displays the secondary video program (step 604). It is noted that the remote device may alternatively not display the secondary video program, or in another alternative, may not receive the secondary video program. A determination is made whether a content switch event has been generated, based on any one of: a manual user input, a timer expiration, or an automatic program change detection (step 606). If the content switch event has not been generated, the remote device continues to receive and display the secondary video program.

If the content switch event is generated (step 606), the remote device sends the content switch event to change to operation Mode B (step 608). The remote device then receives a primary video program (step 610) and displays the primary video program (step 612). A determination is made whether a second content switch event has been generated, based on any one of: a manual user input, a timer expiration, or an automatic program change detection (step 614). If the second content switch event has not been generated, the remote device continues to receive and display the primary video program. If the second content switch event is generated (step 614), the remote device sends the second content switch event to change to operation Mode A (step 616) and resumes receiving the secondary video program (step 602).

Figure 7:
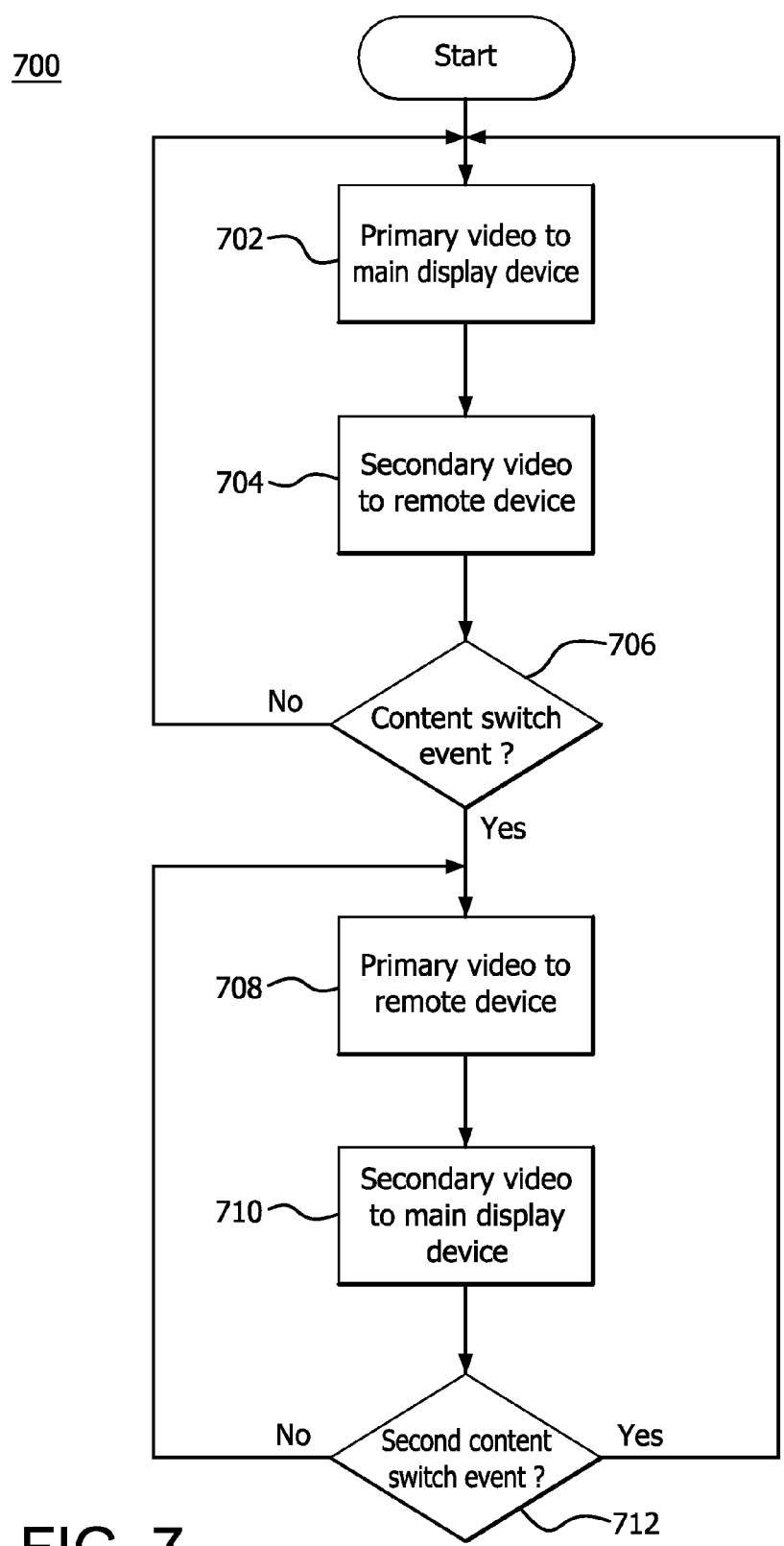
FIG. 7 is a flowchart of a method for displaying primary and secondary video programs on a main display device and a remote device.

FIG. 7 is a flow chart of a method 700 for displaying primary and secondary video programs on a main display device and a remote device. A primary video program is displayed on a main display device (step 702) and a secondary video program is displayed on a remote device (step 704). It is noted that steps 702 and 704 may be performed concurrently or in any order and that, alternatively, the remote device may not display the secondary video program. A determination is made whether a content switch event has occurred, to switch from operating Mode A, in which the primary video program is displayed on the main display device and the secondary video program is received by and optionally displayed on the remote device, to operating Mode B, in which the primary video program is displayed on the remote device and the secondary video program is displayed on the main display device (step 706). If a content switch event has not occurred, the main display device and the remote device remain in operating Mode A.

If a content switch event has occurred (step 706), the main display device and the remote device are switched to operating Mode B, in which the primary video program is displayed on the remote device (step 708) and the secondary video program is displayed on the main display device (step 710). It is noted that steps 708 and 710 may be performed concurrently or in any order. A determination is then made if a second content switch event has occurred, to switch from operating Mode B back to operating Mode A (step 712). If the second content switch event has not occurred, then the main display device and the remote device remain in operating Mode B. If the second content switch event has occurred, then the main display device and the remote device both switch back to operating Mode A (step 702).

The present invention may also be implemented as an application installed on a smart phone, whereby the application provides remote control of the main display device, as well as providing the manual user input (e.g., a soft button or voice input) to facilitate generating the content switch event. The application may also include the various features of the remote device described above in connection with FIG. 5.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the present invention.

The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. In a system including a main display device and a portable remote device, a method comprising:
   in response to a content switch event at the portable remote device, switching a display of a first content item from the main display device to the portable remote device and switching a display of a second content item from the portable remote device to the main display device, wherein the content switch event includes at least one of: a timer expiration or an automatic content change detection.

2. The method according to claim 1, wherein the switching includes:
   prior to the switching, providing the first content item from a video controller to the main display device for display and providing the second content item from the video controller to the portable remote device for display, wherein the video controller is separate from the main display device and the portable remote device; and
   after the switching, providing the first content item from the video controller to the portable remote device for display and providing the second content item from the video controller to the main display device for display.

3. The method according to claim 1, wherein the switching includes:
   prior to the switching, displaying the first content item at the main display device and providing the second content item from the main display device to the portable remote device for display; and
   after the switching, displaying the second content item at the main display device and providing the first content item from the main display device to the portable remote device for display.

4. The method according to claim 1, wherein the switching includes:
   prior to the switching, displaying the second content item at the portable remote device and providing the first content item from the portable remote device to the main display device for display; and
   after the switching, displaying the first content item at the portable remote device and providing the second content item from the portable remote device to the main display device for display.

5. The method according to claim 1, wherein
   the main display device includes a television; and
   the portable remote device includes a video-enabled remote control device.

6. The method according to claim 1, wherein the portable remote device includes a video-enabled cellular telephone device.

7. The method according to claim 1, further comprising:
   in response to another content switch event at the portable remote device, switching the display of the first content item from the portable remote device back to the main display device and switching the display of the second content item from main display device back to the portable remote device.

8. A method for displaying two different content items on a main display device and a remote device, comprising:
   displaying content in a first display mode, including displaying a first content item on the main display device;
   generating a content switch event to switch from the first display mode to a second display mode, wherein the content switch event includes at least one of: a timer expiration or an automatic content change detection; and
   displaying content in the second display mode, including:
       displaying a second content item on the main display device; and
       displaying the first content item on the remote device.

9. The method according to claim 8, wherein the first display mode further includes displaying the second content item on the remote device.

10. The method according to claim 8, further comprising:
generating a second content switch event to switch from the second display mode to the first display mode.

11. A method for displaying two different content items, employing a main display device and a remote device, the method comprising:
in a first mode, displaying a first content item on the main display device; and
in a second mode, displaying the first content item on the remote device and displaying a second content item on the main display device responsive to a switch event, wherein the switch event includes at least one of: a timer expiration or an automatic content change detection.

12. A system for displaying two different content items on a main display device and a remote device, comprising:
a main display device, configured to display a first content item in a first display mode; and
a remote device, including:
a display; and
a content switch configured to generate a content switch event, to switch from the first display mode to a second display mode, in which the main display device displays a second content item and the remote device displays the first content item, wherein the content switch includes at least one of: a timer or an automatic content change detector.

13. The system according to claim 12, wherein the remote device is further configured to display the second content item in the first display mode.

14. The system according to claim 12, wherein the content switch is further configured to generate a second content switch event to switch from the second display mode to the first display mode.

15. The system according to claim 14, wherein:
responsive to the content switch event, the timer or the automatic content change detector automatically enabling generation of the second content switch event.

16. The system according to claim 12, further comprising:
a video source, configured to provide the first content item and the second content item.

17. The system according to claim 16, wherein
the video source is configured to provide the first content item and the second content item to the main display device; and
the main display device further includes a transmitter, wherein in the second display mode, the transmitter sends the first content item to the remote device.

18. The system according to claim 16, wherein
the video source is configured to provide the first content item and the second content item to the remote device; and
the remote device further includes a transmitter, wherein in the first display mode, the transmitter sends the first content item to the main display device and in the second display mode, the transmitter sends the second content item to the main display device.

19. The system according to claim 16, further comprising:
a video controller in communication with the video source, the main display device, and the remote device, wherein the video controller is configured to:
send the first content item to the main display device in the first display mode; and
receive the content switch event from the remote device, such that in the second display mode, the video controller sends the second content item to the main display device and the first content item to the remote device.

20. A portable remote device, comprising:
a content switch configured to generate a content switch event that initiates a switch of a display of a first content item from the portable remote device to a main display device and a display of a second content item from the main display device to the portable remote device, wherein the content switch includes at least one of: a timer or an automatic program change detector.

21. The portable remote device according to claim 20, further comprising:
a receiver configured to receive the first content item and the second content item; and
a transmitter configured to transmit a select one of the first content item or the second content item to the main display device responsive to the content switch event.

22. The portable remote device according to claim 20, further comprising:
a computer-readable medium storing a program comprising a set of instructions that, when executed, manipulate the portable remote device to:
control at least one operation of the main display device; and
facilitate display of content at the portable remote device.

23. The portable remote device according to claim 20, wherein the portable remote device comprises at least one of: a portable remote control device for controlling operation of the main display device or a display-enabled cellular telephone device.

24. The portable remote device according to claim 20, further comprising:
a switch processor in communication with the content switch, the switch processor configured to receive input from the content switch and to generate the content switch event.

25. The portable remote device according to claim 24, further comprising:
a transmitter in communication with the switch processor, the transmitter configured to transmit the content switch event.

26. A computer-readable storage medium storing a set of instructions for execution by a portable remote device, the set of instructions comprising:
instructions that, when executed, manipulate the portable remote device to generate a content switch event that initiates a switch of a display of a first content item from the portable remote device to a main display device and a display of a second content item from the main display device to the portable remote device, wherein the content switch event includes at least one of: a timer expiration or an automatic content change detection.

27. The computer-readable storage medium according to claim 26, wherein the set of instructions further comprise:
instructions that, when executed, manipulate the portable remote device to:
control at least one operation of the main display device; and
facilitate display of content at the portable remote device.

* * * * *